United States Patent [19]

Lysson et al.

[11] Patent Number: 5,897,681
[45] Date of Patent: Apr. 27, 1999

[54] METHOD OF DRAWING AN OPTICAL FIBER

[75] Inventors: Hans-Jürgen Lysson, Korschenbroich, Germany; Anne Dieumegard, Houplin Ancoisne; Arnaud Mairesse, Lille, both of France

[73] Assignee: Alcatel, France

[21] Appl. No.: 08/972,638

[22] Filed: Nov. 18, 1997

[30] Foreign Application Priority Data

Dec. 17, 1996 [EP] European Pat. Off. ............. 96402772

[51] Int. Cl.⁶ ..................... C03B 37/02; C03B 37/025
[52] U.S. Cl. .................. 65/435; 65/424; 65/434; 65/510; 65/513; 65/532; 65/538
[58] Field of Search ............. 65/424, 434, 435, 65/510, 513, 532, 538

[56] References Cited

U.S. PATENT DOCUMENTS

| | | | |
|---|---|---|---|
| 3,540,870 | 11/1970 | Li | 65/532 |
| 4,673,427 | 6/1987 | Van Der Giessen et al. | 65/435 |
| 5,356,449 | 10/1994 | Kuwahara et al. | 65/435 |
| 5,377,491 | 1/1995 | Schulte | 65/540 |

FOREIGN PATENT DOCUMENTS

| | | | |
|---|---|---|---|
| 79186 | 5/1983 | European Pat. Off. | 65/513 |
| 0 653 353 A1 | 5/1995 | European Pat. Off. | |
| 29 06 071 A1 | 8/1979 | Germany . | |
| 53-125037 | 11/1978 | Japan | 65/435 |
| 3-153540 | 7/1991 | Japan | 65/434 |
| 4-325431 | 11/1992 | Japan | 65/424 |
| 6-239639 | 8/1994 | Japan | 65/435 |

*Primary Examiner*—Peter Chin
*Assistant Examiner*—Michael P. Colaianni
*Attorney, Agent, or Firm*—Ware, Fressola, Van der Sluys & Adolphson LLP

[57] ABSTRACT

To draw an optical fiber (10) from one end of a glass preform (9) which is heated to above the glass softening temperature at least in that area, a gas (21) flows around the preform (9) into a furnace space (16) during the drawing process and subsequent feeding of the preform. During the feeding, the areas that are adjacent to the drawing end of the preform (9) pass through gas zones in which the helium content of the furnace gas increases in the drawing direction.

12 Claims, 1 Drawing Sheet

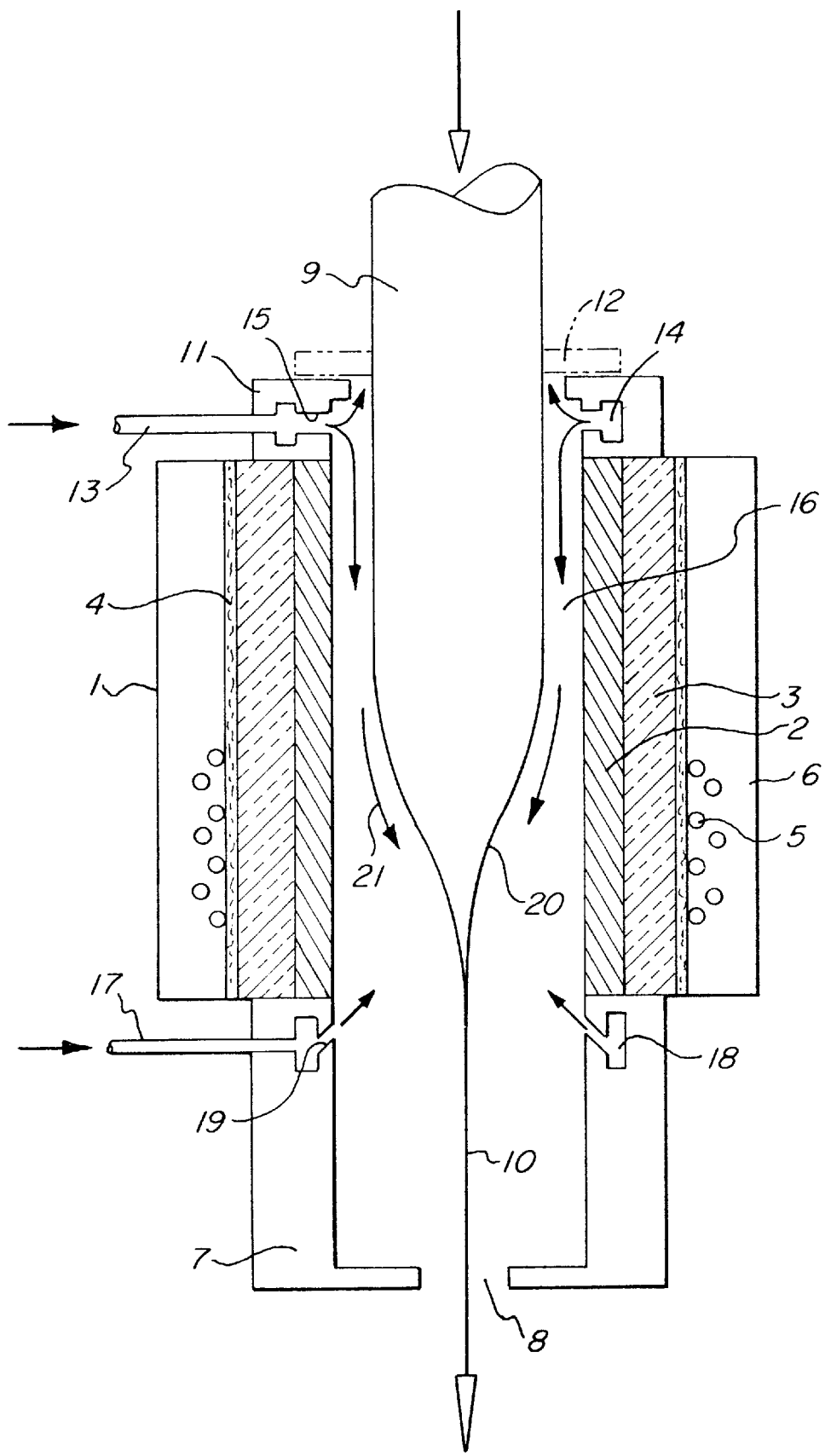

METHOD OF DRAWING AN OPTICAL FIBER

BACKGROUND OF THE INVENTION

1. Technical Field

The present invention concerns a method of drawing an optical fiber from the end of a glass preform which is heated to above the glass softening temperature at least in that area, while a gas flows around the preform during the drawing process and the subsequent feeding of the preform into a furnace space.

2. Description of the Prior Art

In one of the generic methods found in EP-A1-0 653 383, gas flows around the preform and the direction of the flow corresponds to the fiber drawing direction, while the gas flowing around the preform in the drawing region is stabilized by means of an additional flushing gas. This eliminates gas turbulence inside the furnace space, or limits its effect on the quality of the optical fiber drawn from the preform to an insignificant degree.

To improve the fiber quality and prevent diameter fluctuations in particular, a helium containing gas has already been guided in a downstream direction through the drawing furnace (DE-OS 29 06 071), at least during a part of the drawing process. This takes place in that a helium-free gas is first fed through the furnace in the drawing direction until the length of the blank is only about 10 cm, and then a helium-containing gas is used. Although the gas turbulence can be reduced in the furnace space because of the helium's higher heat conductivity and lower heat capacity as compared to other protective gases, the known measure however implies a considerable control engineering effort and uncertainty about the fiber quality during the gas change. This applies above all because of ever increasing requirements for higher production speeds and stricter specifications for the fiber diameter. Up to now in the field of optical fiber, requirements were made with respect to fiber diameters of 125 $\mu$m. It was requested that this diameter should be within a tolerance range of ±2 $\mu$m. Meanwhile, based on increasing requirements for higher production speeds and stricter specifications for the fiber diameter tolerance ranges of ±1.0 $\mu$m are discussed based on online measurements at a high frequency.

To this must be added that more economy with improved fiber quality is demanded from the drawing process, requirements which cannot be achieved with the process cited last. Increased leakage can therefore always be expected on the inlet side of the drawing furnace, which results in an increased loss of helium if, as required to prevent diameter variations, a gas with a high helium content must flow from top to bottom through the furnace toward the drawing region.

SUMMARY OF THE INVENTION

Starting from this state of the art, it is an object of the invention to improve the fiber quality in spite of higher drawing speeds, and to comply with the narrow tolerances linked to the fiber dimensions. Beyond that it must be ensured that the helium leakage is reduced to a tolerable and cost-effective degree.

This object is achieved by the invention in that, during the feeding of the preform, the areas adjacent to the drawing end of the preform pass through gas zones in which the helium content of the furnace gas increases in the drawing direction. In contrast to the known method wherein the flow of helium changes constantly as a function of the outside dimensions, the invention provides a basic setting of the helium concentration which remains the same throughout the entire drawing process. This leads to an increase in the quality of the drawn fiber and to a significant calming of the turbulence in the protective gases flowing along the entire length of the furnace interior.

The basic setting chosen according to the invention has still another advantage when the helium content of the gas that flows into the furnace space increases in the drawing direction from less than 30% to over 60%. For example, with 15% of helium and the rest of argon, the argon acts as a buffer gas in the upper furnace area with negligible helium leakage, while for example a 70% portion of helium with reference to the furnace gas volume in the neckdown drawing region has no helium leakage and leads to an improvement of the fiber quality and to constant fiber dimensions.

The difference in the percentage of the helium content in the furnace gas in the upper and lower furnace space can be further increased by reducing the helium leaks if, according to a further idea of the invention, the helium content of the gas flowing into the furnace space increases from less than 15% to over 85%. The helium content of the entire furnace gas surrounding the preform during the drawing process is preferably less than 30%.

The furnace or flushing gas used for the purpose of the invention can be used in conjunction with other known protective gases such as argon, nitrogen or similar. To prevent expensive leakage, it is essential that only small portions of helium are added to the flushing gas supplied on the inlet side of the furnace, thus the preponderant amount of protective gas takes over the function of a buffer gas to prevent helium leaks in this area. In this way, it could be an advantage to omit altogether feeding portions of helium in the upper furnace area.

A particularly advantageous variation of the solution of the invention is to supply between 2 and 5 l/min of argon as well as 0.3 to 1.3 l/min of helium to the inlet end of the furnace space, and 0 to 0.2 l/min of argon and between 0.25 and 0.7 l/min of helium to the outlet end. This basic setting of the flows achieves the requirements of low helium consumption, good fiber quality and constant fiber dimensions while also taking the required fluctuations of ±1.0 $\mu$m into consideration.

In carrying out the method of the invention, it is advantageous to select a furnace structure in which the heating of the glass preform takes place in a vertical drawing furnace. The furnace wall surrounding the preform at a distance is heated, and the furnace area surrounding the fiber in the lower furnace space is filled with a protective gas which is blown into said space via separate gas feed lines. The invention provides a first gas feed at the inlet end of the furnace space and a second at the outlet end in the neckdown drawing region. This constructive design therefore differs significantly from the known design, wherein the varying composition of helium with another protective gas is fed exclusively from above into the furnace space, and from there it is diverted in the drawing direction to the neckdown region of the preform.

In this connection, it is also useful to let the gas feeds end in distribution chambers that are adjacent to the furnace space. This measure provides a considerable uniformity of the gas streams in this furnace area. Beyond that at the same time these distribution chambers can be used to advantage as mixing chambers for the gas components, which is a further advantage in connection with the improvement of the production parameters in the furnace interior surrounding the preform.

Starting from the mixing chambers, the gas supply for the furnace space is provided at the outlet end through gas inlets located there, e.g. annular nozzles which can be inclined to advantage against the drawing direction.

The invention will be fully understood when reference is made to the following detailed description taken in conjunction with the accompanying drawing.

BRIEF DESCRIPTION OF THE DRAWING

The Figure is a schematic cross-sectional view of a drawing furnace performing the method of the invention.

DETAILED DESCRIPTION OF THE INVENTION

The drawing furnace 1 used as an example comprises the cylindrical susceptor or heating tube 2, an outwardly adjacent insulation 3 which is also cylindrical, as well as a quartz tube 4. In the illustrated embodiment, the susceptor 2 and the insulation 3 are made of graphite, but the susceptor 2 which functions as the heating tube can also be made of a zirconium oxide stabilized with yttrium. In that case, the susceptor 2 can be seen as a short-circuited winding for the induction coil 5. The drawing furnace 1 is closed to the outside by a concentric outer wall 6 and the flange-type bottom 7 with an opening 8 at the outlet side for the passage of the optical fiber 10 drawn from the preform 9.

The pertinent furnace cover is designated by 11, a seal 12 preferably made of an elastic material, perhaps silicone rubber, can be used in this area to further reduce gas leaks.

The gas feed 13 is located in the furnace cover 11, a circumferential distribution chamber 14 with outlet nozzles 15 provides a uniform gas supply into the annular space 16 formed by the surface of the preform 9 and the surrounding susceptor 2. The other area of this annular space 16 and the incoming furnace gas, with or with only a small amount of helium, form a gas buffer zone that is directed toward the inlet end of the drawing furnace 1, preventing the helium, which is essential for maintaining the quality of the fiber 10, from escaping.

The helium supply which is essential for the fiber drawing process is fed through the gas line 17. The gas fed in this way provides for the required fiber quality and constancy of the outer fiber dimensions. A distribution chamber 18 extending circumferentially and corresponding gas outlets (gas nozzles) 19 provide for a uniform gas supply in the neckdown drawing region 20 of the preform 9. Depending on the position of the neckdown drawing region, it can be advantageous to incline the gas outlets 19 in the opposite direction of the fiber draw, thus e.g. pointing diagonally upward.

The arrows 21 are only used in the figure to clarify the basic flow of the furnace gas. In this case, it is decisive that a gas mixture, e.g. of helium/argon at the ratio of 15% to 85% is provided via the gas line 13, and at the same time a gas mixture of helium/argon at the ratio of 95% to 5% is provided via the gas line 17. Based on the schematically illustrated flow conditions in the furnace space and the gas containing mostly argon brought in through the gas line 13, a helium content which increases from top to bottom and is e.g. 25% to 30% of the furnace gas in the neckdown drawing region 20, is the result in the annular space 16 that surrounds the preform 9 and the fiber 10.

The invention is of course not limited to the illustrated furnace shape. Any other configurations are possible insofar as they allow a basic adjustment of the furnace gas during the fiber drawing process which ensures different helium contents in the preform 9-to-optical fiber 10 area. Because of its low heat capacity, the helium gas contributes significantly to the prevention of turbulence in the furnace space. This gas thereby directly influences the neckdown drawing region 20 which is essential for the creation of the fiber 10, while the upper furnace space receives a gas containing only little or no helium, thus avoiding the previous helium loss during the introduction of the helium gas from above into an area of the furnace in which the helium can exert its positive effect on the drawing process. The method of the invention therefore makes a particularly economical production process possible.

The preferred embodiment described above admirably achieves the objects of the invention. However, it will be appreciated that departures can be made by those skilled in the art without departing from the spirit and scope of the invention which is limited only by the following claims.

What is claimed is:

1. A method of drawing an optical fiber from one end of a glass preform, comprising the steps of:

(a) heating at least the one end of the glass preform to above the glass softening temperature in a furnace space;

(b) drawing an optical fiber from the at least one end of the glass preform in a drawing direction; and (c) providing a first gas flow into an upper portion of the furnace space and a second, helium-rich, gas flow into a lower portion of the furnace space to create gas zones therein in which helium content increases in the drawing direction.

2. A method as claimed in claim 1, wherein the helium content of the gas flowing into the furnace space increases from less than 30% to more than 60% in the drawing direction.

3. A method as claimed in claim 2, wherein the helium content of the gas flowing into the furnace space increases from less than 15% to more than 85% in the drawing direction.

4. A method as claimed in claim 1, wherein the helium content of gas in the furnace space surrounding the preform is less than 30%.

5. A method as claimed in claim 1, wherein helium is used in conjunction with another protective gas.

6. A method as claimed in claim 1, wherein the protective gas is selected from the group consisting of argon and nitrogen.

7. A method as claimed in claim 1, wherein the gas respective gas flows are argon/helium mixtures, between 2 and 5 1/min of argon as well as 0.3 to 1.3 1/min of helium are supplied at an inlet end of the furnace space and 0 to 0.2 1/min of argon as well as between 0.25 and 0.7 1/min of helium are supplied at an outlet end of the furnace space.

8. A method as claimed in claim 1, further including the step of providing a vertical drawing furnace which performs the heating step and defines the furnace space, the furnace has first and second gas feed lines to provide the first and second gas flows into the furnace space, the first gas feed is provided at an inlet end of the furnace space and the second gas feed line is provided above an outlet end of the furnace space.

9. A method as claimed in claim 8, wherein the gas feed lines end in distribution chambers which are adjacent to the furnace space.

10. A method as claimed in claim 9, wherein the distribution chambers are mixing chambers.

11. A method as claimed in claim 8, wherein the second gas feed line has gas outlets inclined against the drawing direction.

12. A method as claimed in claim 5,
    wherein said first gas flow comprises predominantly said other protective gas, thereby minimizing leakage of helium from said upper portion of said furnace space.

\* \* \* \* \*

UNITED STATES PATENT AND TRADEMARK OFFICE
CERTIFICATE OF CORRECTION

PATENT NO.  : 5,897,681
DATED       : April 27, 1999
INVENTOR(S) : Hans-Jürgen Lysson, Anne Dieumegard and Arnaud Mairesse It is certified that error appears in the above-identified patent and that said Letters Patent is hereby corrected as shown below:

In column 4, line 40 (claim 7, line 1), "gas" should be deleted.

Signed and Sealed this

Fourteenth Day of September, 1999

Attest:

Q. TODD DICKINSON

*Attesting Officer*    *Acting Commissioner of Patents and Trademarks*